US012076778B2

(12) United States Patent
Sommer et al.

(10) Patent No.: US 12,076,778 B2
(45) Date of Patent: Sep. 3, 2024

(54) ADAPTER ELEMENT FOR ATTACHING A DIE HOLDER TO A TOOL CLAMP

(71) Applicant: TOX PRESSOTECHNIK GMBH & CO. KG, Weingarten (DE)

(72) Inventors: Sascha Sommer, Sigmaringendorf (DE); Michael Badent, Weingarten (DE); Juergen Sollner, Wangen (DE); Frank Schlagenhauf, Unterwaldhausen (DE); Matthias Lobert, Boesingen-Herrenzimmern (DE)

(73) Assignee: TOX PRESSOTECHNIK GMBH & CO. KG, Weingarten (DE)

( * ) Notice: Subject to any disclaimer, the term of this patent is extended or adjusted under 35 U.S.C. 154(b) by 766 days.

(21) Appl. No.: 17/174,441

(22) Filed: Feb. 12, 2021

(65) Prior Publication Data

US 2021/0229161 A1    Jul. 29, 2021

Related U.S. Application Data

(63) Continuation of application No. PCT/EP2019/069915, filed on Jul. 24, 2019.

(30) Foreign Application Priority Data

Aug. 22, 2018    (DE) ..................... 10 2018 120 500.7

(51) Int. Cl.
*B21D 37/04*    (2006.01)
*B21J 15/36*    (2006.01)
(Continued)

(52) U.S. Cl.
CPC .............. *B21J 15/36* (2013.01); *B21D 37/04* (2013.01); *F16B 1/00* (2013.01); *F16B 2/02* (2013.01)

(58) Field of Classification Search
CPC .. B21J 15/02; B21J 15/10; B21J 15/36; F16B 1/00; F16B 2/02; B21D 37/04
See application file for complete search history.

(56) References Cited

U.S. PATENT DOCUMENTS

| 5,042,352 | A | 8/1991 | Lux |
| 2011/0277288 | A1* | 11/2011 | Wendt ..................... B21J 15/02 29/243.53 |

(Continued)

FOREIGN PATENT DOCUMENTS

| DE | 20 2006 013 082 U1 | 12/2006 |
| DE | 10 2009 030 103 A1 | 12/2010 |

(Continued)

OTHER PUBLICATIONS

German Search Report (Application No. 10 2018 120 500.7) dated May 24, 2019.

(Continued)

*Primary Examiner* — Daniel J Wiley
(74) *Attorney, Agent, or Firm* — BURR PATENT LAW, PLLC (57) ABSTRACT

An adapter element for attaching a die holder to a tool clamp is provided. The adapter element includes a mounting element for mounting the die holder. The adapter element has mounting mechanisms that connect the adapter element and a connecting mechanism of a clamp bow of the tool clamp, whereby automatic attachment and/or automatic release between the adapter element and the clamp bow is enabled.

11 Claims, 4 Drawing Sheets

(51) Int. Cl.
*F16B 1/00* (2006.01)
*F16B 2/02* (2006.01)

(56) References Cited

U.S. PATENT DOCUMENTS

2012/0204618 A1   8/2012   Badent
2016/0288197 A1   10/2016  Tripp et al.

FOREIGN PATENT DOCUMENTS

| DE | 10 2009 038 607 A1 | 3/2011 |
| DE | 10 2011 122 093 A1 | 6/2013 |
| DE | 20 2013 011 928 U1 | 12/2014 |
| DE | 10 2013 021 056 A1 | 6/2015 |
| DE | 10 2017 119 372 A1 | 2/2019 |
| EP | 1 674 171 A1 | 6/2006 |

OTHER PUBLICATIONS

International Search Report and Written Opinion (Application No. PCT/EP2019/069915) dated Oct. 29, 2019.
English translation of International Preliminary Report on Patentability (Chapter I) (Application No. PCT/EP2019/069915) dated Feb. 23, 2021, 7 pages.

* cited by examiner

ADAPTER ELEMENT FOR ATTACHING A DIE HOLDER TO A TOOL CLAMP

CROSS REFERENCE TO RELATED APPLICATIONS

This application is a continuation of International Application No. PCT/EP2019/069915 filed Jul. 24, 2019, which designated the United States, and claims the benefit under 35 USC § 119(a)-(d) of German Application No. 10 2018 120 500.7 filed Aug. 22, 2018, the entireties of which are incorporated herein by reference.

FIELD OF THE INVENTION

The present invention relates to an adapter element for attaching a die holder to a tool clamp, and also to a die holder, a clamp bow of a tool clamp for attachment with an adapter element and/or to a tool clamp for attachment with an adapter element.

BACKGROUND OF THE INVENTION

Tools for joining purposes routinely have to satisfy complex or different requirements. Modern tools need to be designed in accordance with working processes that have to be run through in an exactly defined manner during joining, with short cycle times with high process reliability being desired. In particular, high process reliability with comparatively long service cycles and/or a variable use of the tools is desired.

Known joining tools comprise a clamp bow on which a die is firmly arranged on one side. It is known for the die to be firmly screwed to the clamp bow. For this reason, known joining tools are used for identical joining processes. A disadvantage thereof is that the joining tool or the clamp bow has to be adapted in a comparatively time-consuming manner for a different joining process, for example, by manually replacing one die by another die on the clamp bow.

SUMMARY OF THE INVENTION

The object of the present invention is to increase the variability of use of a tool clamp in combination, in particular, with short cycle times and/or comparatively long service cycles.

The present invention starts from an adapter element for attaching a die holder to a tool clamp, in particular, for attaching a die holder to a joining clamp.

For example, a die holder is arranged on a clamp bow of a tool clamp. The clamp bow of the tool clamp advantageously takes the form of a C bow. The tool clamp takes the form, for example, of a joining clamp, a clinching clamp and/or an embossing clamp.

A core of the present invention can then be seen in the fact that the adapter element comprises a mounting element, and the mounting element is designed to arrange the die holder, wherein the adapter element has a mounting mechanism, wherein the mounting mechanism is designed to arrange the adapter element on a connecting mechanism of a clamp bow of the tool clamp, with the result that automatic attachment of the adapter element to the clamp bow and/or automatic release from the clamp bow are/is realized. There is thus realized a comparatively cost-effective automatic change system for changing a die and/or a die holder of a tool clamp, thereby making possible comparatively short cycle times and/or comparatively long service cycles.

The mounting element of the adapter element is advantageously designed to arrange an, in particular, conventional, standard die holder of the tool clamp. For example, the standard die holder is present for nonautomatic changeable use. A standard die holder is designed, for example, to interact with a proposed adapter element. A standard die holder is, for example, already known from the prior art as, for example, a conventional die holder. A standard die holder is present, for example, in a form which allows it to be screwed to the clamp bow of the tool clamp.

The adapter element is designed, in particular, as a tool clamp adapter element, for example, as a joining clamp adapter element.

Adaptation of the tool clamp, in particular, of the clamp bow and/or of the die holder, is advantageously necessary only once. For example, a connecting mechanism, for example, in the form of a bolt, is to be fitted at the tool clamp, in particular, the clamp bow, into standard connecting mechanisms, for example, in the form of receptacles, which are, in particular, already present on the clamp bow, in order to realize automatic attachment and/or release of the adapter element to or from the clamp bow. An automatic change of adapter elements at the clamp bow, and hence of standard die holders, is realized as a result. The standard connecting mechanisms are designed, for example, to attach a standard die holder to the clamp bow. A standard connecting mechanism is designed, for example, as a thread bore, in particular, as a thread blind-hole bore.

It is further proposed that the adapter element is designed to realize automatic attachment of the adapter element, with die holder arranged thereon, to the clamp bow and/or automatic release from the clamp bow. Advantageously, a standard die holder can be securely mounted, for example screwed, on the adapter element. For example, the standard die holder can be attached to a mounting element, in particular to a plurality of, for example two, three or four, mounting elements of the adapter element.

In addition, it proves to be advantageous that a mounting element is designed as an element of a locating fit, for example, in the form of a locating bore. In one advantageous modification of the present invention, the adapter element has two mounting elements, and each mounting element is designed as an element of a locating fit. For example, the elements of a locating fit of the mounting elements are the same, for example, present identically. Advantageously, in particular, precisely two mounting elements are present as an element of a locating fit. It is also conceivable for a mounting element to be designed as a stop or a stop surface. It can also be envisioned that a mounting element is present as a locating pin or a bolt of a locating fit. A mounting element, in particular, two mounting elements, is/are preferably realized in the form of an internal thread. Advantageously, two mounting elements are designed in the form of an element of a locating fit, of a locating pin or of a stop, and two further mounting elements are designed in the form of a fastening device, such as, for example, an internal thread.

It is also advantageous that the mounting mechanism comprises a mounting member, wherein the mounting member is present in the form of a locating bore and/or in the form of a locating pin. For example, the adapter element comprises precisely two mounting members.

It is also proposed that the connecting mechanism of the clamp bow comprises a connecting point on the clamp bow and a connecting element, for example, a locating pin. The connecting element, for example, the locating pin, can be mounted, for example, on the connecting point.

The connecting point is present, for example, as an internal thread. It is also conceivable for the connecting point to be present as a standard connecting point. The connecting mechanism comprises, for example, a connecting element which, for example, is designed, in particular, in addition to a standard connecting mechanism, for example, the connecting point on the clamp bow. A standard connecting mechanism, for example, the connecting point, is present, for example, for attaching the standard die holder to the clamp bow.

The connecting element is present, for example, as a bolt and/or as a pin, in particular, as a locating pin and/or as a locating bolt. It is also conceivable for the connecting element to be designed as an element of a locating fit. It can be envisioned that the connecting element is present as a stop and/or as a locating bore. Advantageously, a plurality of connecting elements, for example two, in particular precisely two, connecting elements, are present on the clamp bow. The connecting element can preferably be connected to the connecting point. For example, the connecting element is designed such that it can be screwed onto and/or into the connecting point.

Advantageously, the connecting element, in particular, the locating pin, is tailored to the mounting member of the mounting mechanism of the adapter element. As a result, a locating fit, and hence an alignment, of the adapter element with respect to the clamp bow is realized. The locating fit advantageously consists of a mounting member of the adapter element and of a connecting element of the clamp bow. Advantageously, the adapter element and the clamp bow, in the mounted state, form two, in particularly precisely two, locating fits.

For automatic attachment of the adapter element to the clamp bow, the adapter element advantageously comprises a clamping device. The clamping device is advantageously designed in such a way that, with the adapter element in the arranged state on the clamp bow, it clamps the adapter element to the clamp bow in that the clamping device clamps the adapter element, in particular, a mounting member of the adapter element, to the clamp bow, for example, to a connecting element of the connecting mechanism of the clamp bow.

For example, the clamping device comprises a clamping element. The clamping element is, for example, bar-shaped, in particular, cylindrical. The clamping element is, for example, mounted on the adapter element so as to be movable, in particular, linearly movable. Advantageously, a direction of movement of the clamping element is transverse, in particular, perpendicular, to a longitudinal extent of the mounting member, for example, transverse, in particular, perpendicular, to an axis of rotation and/or axis of symmetry of the mounting member.

The clamping element is advantageously arranged on the adapter element so as to be preloaded by means of a spring element of the clamping device. For example, the clamping element is designed to be movable counter to a spring force of the spring element. For example, the adapter element is configured in such a way that an external means, for example, a person, a release member of a storage station for the adapter element and/or a robot arm, can move the clamping element by engaging on the adapter element, for example, by pressing in a spigot of the clamping device. Advantageously, the spigot acts on the clamping element and/or with the clamping element. For example, the spigot is part of the clamping element, with, for example, the two elements being present in one piece.

Advantageously, the adapter element comprises gripping members. The gripping members are designed, for example, in the manner of rails. For example, the gripping members are designed as, in particular, linearly extending notches on the adapter element. For example, two gripping members are formed and arranged on the adapter element with mirror symmetry. Advantageously, the adapter element comprises a fixing element; for example, a gripping member comprises a fixing element. The fixing element is present, for example, as a blind-hole bore. By means of the fixing element, the adapter element is designed such that it can be fixed, for example, at a storage station by the storage station. Advantageously, the storage station comprises a fixing member by means of which the adapter element can be fixed at the storage station. For example, a fixing member, for example, a pin and/or a bolt, of the storage station act/acts on the fixing element with the adapter element in the arranged state on the storage station, for example, in the state in which the adapter element is demounted from the clamp bow, and thus fixes the adapter element at the storage station.

One advantageous embodiment of the present invention is also an adapter element for attaching a die holder to a tool clamp, for example, for attaching a die holder to a joining clamp, in particular, according to one of the above-described variants, wherein the adapter element comprises a mounting member, and the mounting member is designed to arrange the adapter element on a clamp bow of the tool clamp, wherein the adapter element has a mounting mechanism, wherein the mounting mechanism is designed to arrange the die holder on the adapter element, with the result that automatic attachment of the die holder to the adapter element and/or automatic release of the die holder from the adapter element are/is made possible.

Advantageously, the mounting member is intended to arrange the adapter element on a standard connecting mechanism of a clamp bow of the tool clamp, the clamp bow being, in particular, a conventional one known, for example, from the prior art. The mounting member is, for example, present as a locating bore. Advantageously, two or more mounting members are provided. A connecting element, for example, in the form of a locating pin, is preferably present. Advantageously, the connecting element engages through the locating bore of the adapter element and connects the adapter element to a connecting point of the clamp bow. It proves to be advantageous if the connecting element can be fixed, for example screwed, to the connecting point. For example, the connecting point comprises an internal thread, and the connecting element comprises an external thread. In this way, the adapter element can be aligned with and fastened to the clamp bow.

It also proves to be advantageous that the adapter element is designed in such a way that, with the adapter element in the arranged state on the clamp bow, automatic attachment of the die holder to the adapter element and/or automatic release of the die holder from the adapter element are/is made possible.

The die holder advantageously comprises attachment mechanisms, wherein the attachment mechanisms are designed to attach the die holder to a standard connecting mechanism of a clamp bow. For example, the attachment mechanism comprises an attachment element, wherein the attachment element is designed to act with the mounting mechanism of the adapter element, with the result that automatic attachment of the die holder to the adapter element and/or automatic release of the die holder from the adapter element can be realized. Such an embodiment of an adapter element is particularly advantageous for already existing joining clamps in which adaptation of the tool clamp is comparatively complicated. Instead, the die holder, for example, is adapted.

An attachment element is designed, for example, as a locating pin or a locating bore. A mounting mechanism of the adapter element is, for example, designed as a locating pin, as a locating bore, as a stop and/or a receptacle. Advantageously, an attachment element of the die holder and a mounting mechanism of the adapter element form a locating fit.

It also proves to be advantageous that a die holder, which is designed for automatically attaching the die holder to the adapter element and/or for automatically releasing the die holder from the adapter element, comprises a holding element and/or a positioning member. A positioning member is designed, for example, in the manner of a rail. For example, the positioning member is formed as, in particular, linearly extending notches on the die holder. For example, two positioning members are formed and arranged on the die holder with mirror symmetry. Advantageously, the die holder comprises a holding element; for example, a positioning member comprises a holding element. The holding element is present, for example, as a blind-hole bore. By means of the holding element, the die holder is designed, for example, such that it can be fixed at a storage station by the storage station. Advantageously, the storage station comprises a fixing member by means of which the die holder can be fixed at the storage station. For example, a fixing member, for example, a pin and/or a bolt, of the storage station act/acts on the holding element in the state in which the die holder is demounted from the adapter element and thus fixes the die holder at the storage station.

Also proposed is a further variant of the present invention in the form of a die holder for attachment to a tool clamp, wherein the die holder is designed to arrange a die, wherein the die holder comprises an attachment mechanism for, in particular direct, attachment of the die holder to a connecting mechanism of a clamp bow, wherein the attachment mechanism of the die holder has an attachment element, wherein the attachment element of the die holder is designed to make possible automatic attachment of the die holder to the adapter element according to one of the aforementioned embodiment variants and/or automatic release of the die holder from the adapter element according to one of the aforementioned embodiment variants. An attachment mechanism is designed, for example, as a locating pin. A connecting mechanism of the adapter element is designed, for example, as a locating bore. Advantageously, the adapter element comprises two locating bores. In this way, an alignment of the die holder relative to the adapter element can be realized.

It can also be envisioned that the die holder and/or the adapter element have/has a clamping device. The clamping device is advantageously designed to clamp the die holder and the adapter element in the state in which they are arranged with one another. For example, the clamping device is designed as described above, with the result that the clamping device clamps one, two or more attachment elements to the adapter element, in particular to in each case a mounting mechanism.

An alternative embodiment of the present invention is a clamp bow of a tool clamp, wherein the clamp bow comprises a connecting point for, in particular direct, attachment of a die holder to the clamp bow, wherein the clamp bow comprises connecting means, wherein the connecting mechanism is designed to realize automatic attachment of the adapter element according to one of the aforementioned embodiment variants to the clamp bow and/or automatic release of the adapter element according to one of the aforementioned embodiment variants from the clamp bow.

A further advantageous variant of the present invention is a system consisting of an adapter element according to one of the aforementioned embodiment variants and of a die holder, in particular according to one of the aforementioned embodiment variants, and/or a system consisting of an adapter element according to one of the aforementioned embodiment variants and of a clamp bow, in particular according to one of the aforementioned embodiment variants.

One advantageous embodiment of the present invention is a tool clamp, in particular a joining clamp, having an adapter element according to one of the aforementioned embodiment variants, a die holder, in particular according to one of the aforementioned embodiment variants, and/or a clamp bow, in particular according to one of the aforementioned embodiment variants.

BRIEF DESCRIPTION OF THE DRAWINGS

An exemplary embodiment will be explained in more detail below on the basis of schematic drawings while specifying further details and advantages.

DETAILED DESCRIPTION OF THE INVENTION

Figure 1:
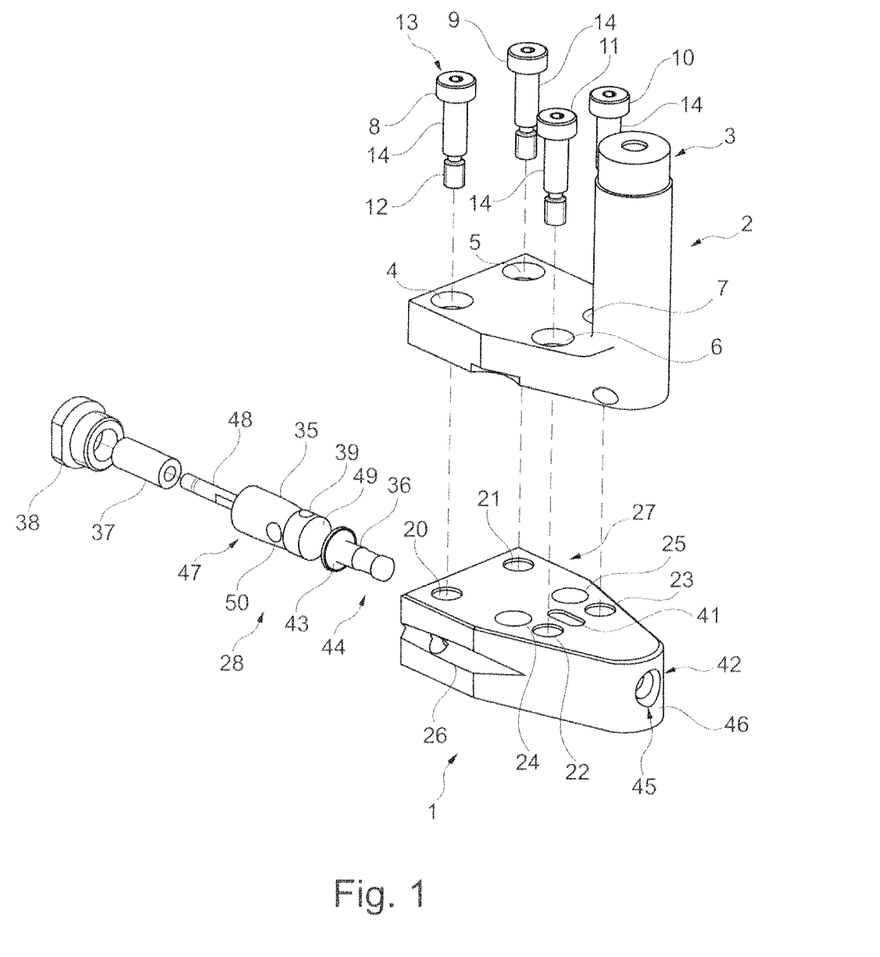
FIG. 1 shows a top front lateral oblique perspective exploded illustration of an adapter element according to the present invention with die holder and die.

FIG. 1 shows an adapter element 1 according to the present invention, a die holder 2 and a die 3. The die holder 2 and the die 3 are advantageously designed in a known manner.

The die holder 2 comprises, for example, attachment mechanisms in the form of through-bores 4 to 7. The through-bores 4 to 7 can respectively be engaged by an attachment element 8 to 11.

Advantageously, the attachment elements 8 to 11 are designed in the form of locating pins or in the form of locating screws which each comprise an external thread 12 at a first end and a screw head 13 at a second end which is spaced apart from and opposite to the first end. Between the first and the second end, the attachment elements 8 to 11 advantageously comprise a cylindrical outer shape 14. As a result, the die 3 can be aligned relative to the adapter element 1 by way of the die holder 2.

Figure 3:
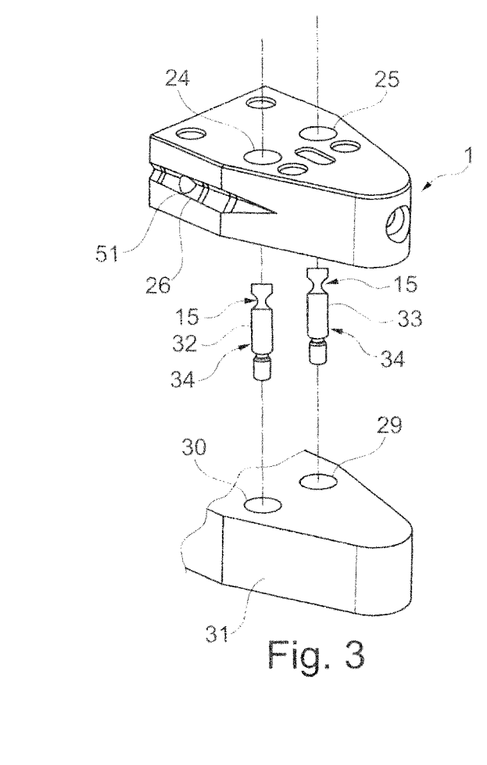
FIG. 3 shows a top front lateral oblique perspective exploded illustration of the adapter element according to FIG. 1, connecting elements and a clamp bow.
Figure 4:
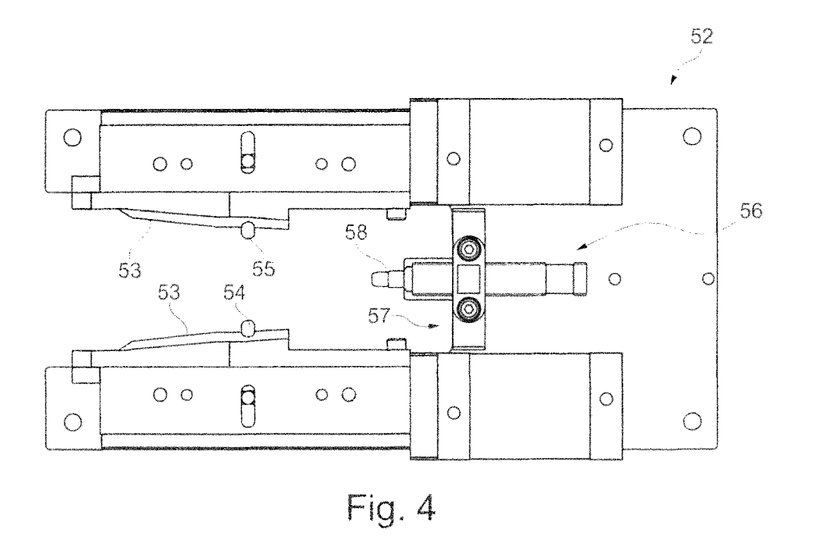
FIGS. 4 and 5 show a plan view of a storage station for the adapter element in an open position and in a closed position.
Figure 5:
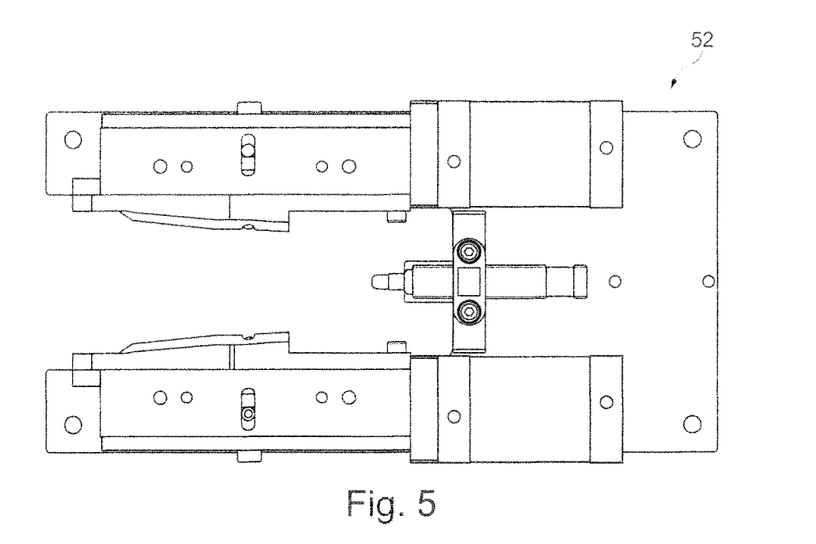
Figure 6:
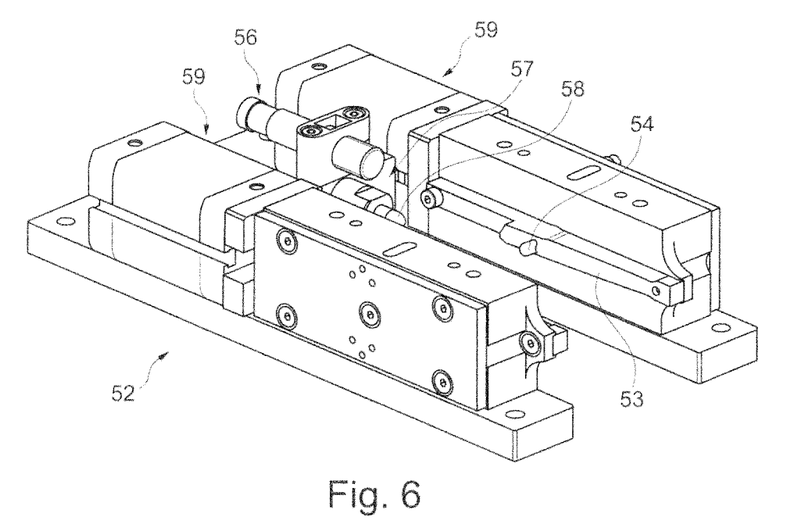
FIGS. 6 and 7 show a top front lateral oblique perspective view of the storage station according to FIGS. 4 and 5.
Figure 7:
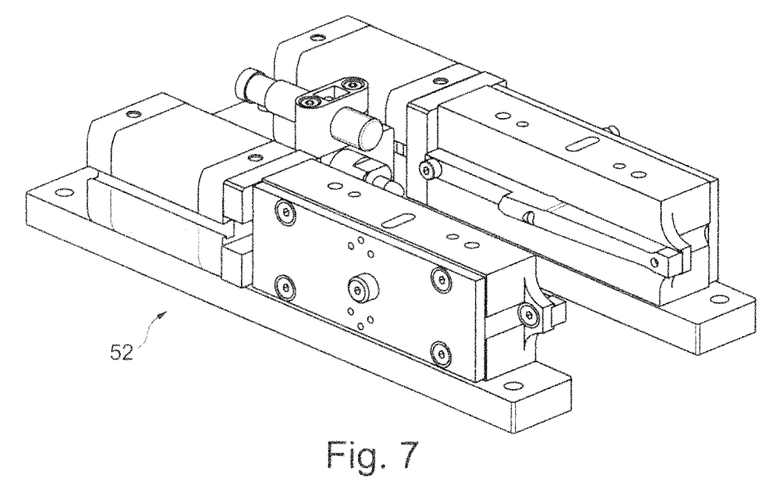

In a known manner, the die holder 2 can be arranged, for example, fastened (not shown), to a standard connecting point 29, 30 of an, in particular known, clamp bow 31 by means of the attachment elements 8 to 11 which engage through the through-bores 4 to 7.

Figure 2:
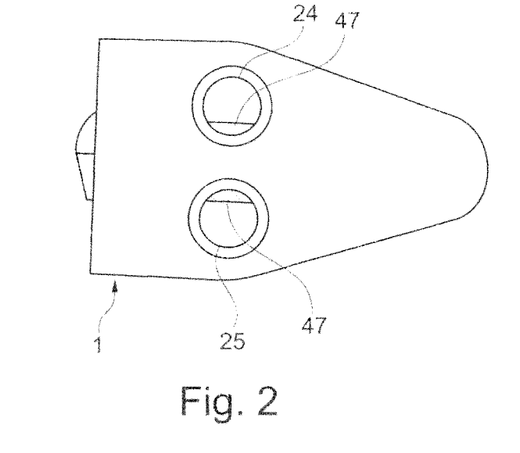
FIG. 2 shows a bottom view of the adapter element according to FIG. 1 in the mounted state.

The adapter element 1 comprises mounting mechanisms in the form of, for example, four blind-hole bores 20 to 23, two mounting members in the form of locating bores 24, 25, two gripping members 26, 27 (one gripping member 26 shown in FIG. 1) and, for example, a clamping device 28 (see also FIG. 2).

The blind-hole bores 20 to 23 are designed, for example, to be identical. Advantageously, in each case two blind-hole bores 20 to 23 are present identically. Advantageously, each blind-hole bore 20 to 23 comprises an internal thread, with the result that the die holder 2 can be fastened to the adapter element 1 by means of the attachment elements 8 to 11. Preferably, the blind-hole bores 22, 23 comprise, in particular, in addition to the internal thread, a cylindrical receptacle which is designed as a counterpart to the outer shape 14 of the attachment elements 8 to 11, with the result that the cylindrical receptacle forms a locating fit with the outer shape 14.

FIG. 3 shows a clamp bow 31 which has connecting points 29, 30. The connecting points 29, 30 are advantageously present as threaded bores. Connecting elements in the form of locating pins 32, 33 can be fastened to, for example, screwed into, the connecting points 29, 30. The locating pins 32, 33 advantageously have a cylindrical outer shape 34 which is tailored to a cylindrical inner shape of the locating bores 24, 25, with the result that a locating pin 32, 33 forms a locating fit with a locating bore 24, 25. In this way, the adapter element 1 can be aligned relative to the clamp bow 31. In the region of the cylindrical outer shape 34, a locating pin 32, 33 advantageously comprises a peripheral notch 15. Particularly as viewed in a cross section, the notch 15 is designed, for example, in the manner of a double cone or in the manner of a torus. For example, the notch 15 is present as a torus-like recess in the cylindrical outer shape 34.

The clamping device 28 advantageously comprises a clamping element 35, a spigot-like operating element 36, a spring element 37 and a securing member 38. The clamping element 35 is, for example, cylindrical in form. The clamping element 35 advantageously comprises an aperture 39 into which, with the clamping device 28 in the mounted state on the adapter element 1, a securing pin can be arranged in an engaging manner. The securing pin can advantageously be fastened, for example, plugged, on the aperture 39 in a projecting manner, with the result that the securing pin, in the state in which it is arranged on the adapter element, is guided in a slotted guide 41 of the adapter element 1. This realizes antirotational safeguarding of the clamping element 35.

The adapter element 1 comprises, for example, a through-bore 42 on which or into which the elements of the clamping device 28 can be inserted or arranged. The through-bore 42 is advantageously oriented transversely, in particular, perpendicularly, to the blind-hole bores 20 to 23 and/or to the locating bores 24, 25. The through-bore advantageously intersects the locating bores 24, 25, with the result that an element present in the through-bore can project into the locating bore 24, 25. The through-bore 42 advantageously comprises a stop against which the operating element 36 bears by way of a stop surface 43 on account of a spring force of the spring element 37 in the mounted state. If the operating element 36 bears by way of its stop surface 43 against the stop of the through-bore 42, an end 44 of the operating element is flush or at least approximately flush with an opening surface 45 of the through-bore 42. Advantageously, the operating element 36 in the bearing state against the stop of the through-bore does not project beyond an outer surface 46 of the adapter element 1.

The securing member 38 is, in the arranged state, screwed to the adapter element 1 (see also FIG. 2). The securing member 38 is advantageously present in such a way that, in the mounted state of the clamping device 28, the securing member 38 fixes remaining elements relative to the adapter element 1. In this way, the securing member 38 forms a stop surface for the spring element 37 in the mounted state on the adapter element 1. The spring element 37 is designed, for example, as a helical spring. The clamping element 35 comprises, in addition to its cylindrical basic body 47, a pin-like guide element 48 which extends in a cylinder axis of the basic body 47. In the arranged state, the guide element 48 is advantageously guided within the spring element 37. As a result, in the state in which the clamping device 28 is arranged on the adapter element 1, the guide element 48 is movable counter to the spring force of the spring element 37 along a longitudinal axis and/or axis of symmetry of the through-bore 42.

In the state in which the operating element 36 bears against the stop of the through-opening 42, the clamping element 35 bears by way of its end face 49 against the operating element 36, with the result that the clamping element 35 has part of its basic body 47 projecting into the locating bores 24, 25. As a result, in the state in which the adapter element 1 is arranged on the clamp bow 31, the clamping device 28 can clamp the adapter element 1 to the locating pins 32, 33, in particular, in a positionally accurate manner.

Release of the adapter element 1 from the clamp bow 31 in the arranged state is achieved by virtue of the fact that cutouts 50 are formed on the basic body 47 of the clamping element 35. The cutouts 50 are advantageously cylindrical. Preferably, a cutout surface of the cutout 50 corresponds to a partial surface of the cylindrical inner shape of the locating bore 24, 25. If an external element is now pressed counter to the spring force of the spring element 37 through the opening surface 45 onto the end 44 of the operating element 36, the clamping element 35 can be moved in the direction of the securing member 38, with the result that the cutout 50 advantageously comes to bear flush with the cylindrical inner shape of the locating bore 24, 25. This results in the locating pin 32, 33 in the locating bore 24, 25 being freed, with the result that the adapter element 1 can be moved away from, for example, removed from, the clamp bow 31 in the direction of an extent of an axis of symmetry of a locating bore 24, 25.

The adapter element 1 additionally advantageously comprises, in particular, on a gripping member 26, a fixing element 51. The fixing element 51 is designed, for example, as a blind hole. The fixing element 51, in particular, the blind hole, advantageously an axis of symmetry of the fixing element 51, extends, for example, transversely, in particular perpendicularly, to the axis of symmetry of the through-bore 42 and transversely, in particular perpendicularly, to the axis of symmetry of the locating bores 24, 25.

The gripping member 26 is designed, for example, as an, in particular, linearly extending, notch. The notch is, for example, V-shaped.

FIGS. 4 to 7 show a storage station 52 according to the present invention. The storage station 52 comprises gripping elements 53 which are advantageously designed in the manner of rails. In the state in which the adapter element 1 is arranged on the storage station 52, the gripping elements 53 advantageously engage in the gripping members 26, 27 of the adapter element 1. Furthermore, the storage station 52 comprises pin-like fixing members 54, 55 by means of which the adapter element 1, in the state in which it is arranged on the storage station 52, can be fixed in a positionally fixed manner. The storage station 52 also comprises a distance sensor 56, a clamp bow detector 57 and an engagement element 58.

The way in which the adapter element 1 is deposited at the storage station 52 is as follows:

In a first step, the clamp bow 31 with the adapter element 1 travels up to the storage station 52. Here, the clamp bow 31 can advantageously be moved by means of a robot arm (not shown), whereas the storage station 52 is arranged in a positionally fixed manner. As it approaches, the adapter element 1 is pushed by the gripping members onto the gripping elements 53. Here, the distance sensor 56 detects a distance of the adapter element 1 from the sensor on the one hand, and the clamp bow detector 57 detects a presence of the clamp bow 31 on the other hand. Here, the adapter element 1 is pushed onto the gripping elements 53 by means of the clamp bow 31 or the robot arm, for example, up to a stop, with the result that the engagement element 58 comes to bear with the end 44 of the operating element 36 and presses in the operating element 36. This results in the clamping element 35 freeing the locating pins 32, 33 of the clamp bow 1.

Then, the storage station 52, by means of the fixing members 54, 55, locks the adapter element 1 on the storage station 52 by virtue of the fixing members 54, 55 being moved by means of a movement device 59 into an engaging, and thus locking, position with the fixing element 51 of the adapter element 1. The fixing members 54, 55 of the storage station 52 are illustrated in an unlocked position in FIGS. 5 and 7 and in the locked position in FIGS. 4 and 6.

If the adapter element 1 is locked on the storage station 52, the clamp bow 31 then moves downward, in the direction of the axis of symmetry of the locating bores 24, 25, with the result that the locating pins 32, 33 are moved out of the locating bores 24, 25. As a result, the clamp bow 31 is free to receive a further adapter element 1 with an identical or different die holder arranged thereon and/or an identical or different die arranged thereon.

LIST OF REFERENCE SIGNS

1 Adapter element
2 Die holder
3 Die
4 Through-bore
5 Through-bore
6 Through-bore
7 Through-bore
8 Attachment element
9 Attachment element
10 Attachment element
11 Attachment element
12 External thread
13 Screw head
14 Outer shape
15 Notch
20 Blind-hole bore
21 Blind-hole bore
22 Blind-hole bore
23 Blind-hole bore
24 Locating bore
25 Locating bore
26 Gripping member
27 Gripping member
28 Clamping device
29 Connecting point
30 Connecting point
31 Clamp bow
32 Locating pin
33 Locating pin
34 Outer shape
35 Clamping element
36 Operating element
37 Spring element
38 Securing member
39 Aperture
41 Slotted guide
42 Through-bore
43 Stop surface
44 End
45 Opening surface
46 Outer surface
47 Basic body
48 Guide element
49 End face
50 Cutout
51 Fixing element
52 Storage station
53 Gripping elements
54 Fixing member
55 Fixing member
56 Distance sensor
57 Clamp bow detector
58 Engagement element
59 Movement device

The invention claimed is:

1. An adapter element for attaching a die holder to a tool clamp, comprising:
   a mounting element for mounting the die holder;
   a first mounting mechanism comprising a mounting member having a form of a locating bore and/or a locating pin adapted to arrange the adapter element on a connecting mechanism of a clamp bow of the tool clamp; and
   a clamping device comprising a clamping element mounted on a connecting element of the connecting mechanism in a linearly movable manner in a transverse direction with respect to a longitudinal extension of the first mounting mechanism,
   whereby automatic attachment and/or automatic release between the adapter element and the clamp bow is enabled.

2. The adapter element for attaching the die holder to the tool clamp as claimed in claim 1, wherein the automatic attachment and/or automatic release between clamp bow and the adapter element is enabled, with the die holder arranged thereon.

3. The adapter element for attaching the die holder to the tool clamp as claimed in claim 1, wherein the adapter element has two mounting elements.

4. The adapter element for attaching the die holder to the tool clamp as claimed in claim 1, wherein the connecting mechanism of the clamp bow comprises a connecting point on the clamp bow and a locating pin that mounts onto the connecting point.

5. The adapter element for attaching a die holder to a tool clamp as claimed in claim 1, further comprising a mounting member adapted to connect the adapter element to the clamp bow of the tool clamp; and
   a second mounting mechanism adapted to connect the die holder to the adapter element,
   whereby automatic attachment and/or automatic release between the die holder and the adapter element is enabled.

6. The adapter element for attaching the die holder to the tool clamp as claimed in claim 5, wherein when the adapter element is connected to the clamp bow, the automatic attachment between the die holder and the adapter element is enabled.

7. A die holder for attachment to a tool clamp comprising the adapter element according to claim 1,
   wherein the die holder holds a die,
   wherein the die holder comprises an attachment mechanism for direct attachment between the die holder and the connecting mechanism of the clamp bow, and
   wherein the attachment mechanism of the die holder has an attachment element that enables automatic attachment release between the die holder and the adapter element.

8. A clamp bow of a tool clamp comprising:
   the adapter element of claim 1, and
   a connecting point for direct attachment of the die holder to the clamp bow,
   wherein the clamp bow comprises a connecting mechanism that permits automatic attachment release between the adapter element and the clamp bow.

9. A system having the adapter element as claimed in claim 1, a die holder, and a clamp bow.

10. A storage station for the adapter element as claimed in claim 1, wherein the storage station comprises a fixing member that fixes the adapter element and/or the die holder at the storage station.

11. A tool clamp having an adapter element as claimed in claim 1, a die holder, and a clamp bow.

* * * * *